United States Patent
Sen et al.

(10) Patent No.: US 11,391,327 B2
(45) Date of Patent: Jul. 19, 2022

(54) BI-DIRECTIONAL FILTERING AIR CIRCULATION COVER FOR CARDAN SHAFTS

(71) Applicant: TIRSAN KARDAN SANAYI VE TICARET ANONIM SIRKETI, Manisa (TR)

(72) Inventors: Onur Sen, Manisa (AR); Esra Özçelik, Manisa (AR)

( * ) Notice: Subject to any disclaimer, the term of this patent is extended or adjusted under 35 U.S.C. 154(b) by 0 days.

(21) Appl. No.: 16/769,007

(22) PCT Filed: May 31, 2019

(86) PCT No.: PCT/TR2019/050409
§ 371 (c)(1),
(2) Date: Jun. 2, 2020

(87) PCT Pub. No.: WO2020/009676
PCT Pub. Date: Jan. 9, 2020

(65) Prior Publication Data
US 2021/0222739 A1    Jul. 22, 2021

(30) Foreign Application Priority Data
Jun. 13, 2018  (TR) .................................. 2018/08475

(51) Int. Cl.
*F16D 3/84* (2006.01)
*B01D 46/54* (2006.01)
(Continued)

(52) U.S. Cl.
CPC ............ *F16D 3/843* (2013.01); *B01D 46/16* (2013.01); *B01D 46/54* (2013.01); *B01D 46/64* (2022.01); *F16D 3/06* (2013.01); *F16D 3/387* (2013.01)

(58) Field of Classification Search
CPC . F16D 3/843; F16D 3/06; F16D 3/387; F16D 3/382; B01D 46/0024; B01D 46/16;
(Continued)

(56) References Cited

U.S. PATENT DOCUMENTS 571,708 A  *  11/1896  Thompson ........... B65D 47/247
                                                      137/845
4,475,737 A    10/1984  Cook et al.
(Continued)

FOREIGN PATENT DOCUMENTS

EP         2975276 A1 *  1/2016  ............... F16D 3/06
EP         2975276 A1    1/2016
TR         201408527     7/2014

OTHER PUBLICATIONS

International Search Report for corresponding PCT/TR/2019/050409.
Written Opinion of the ISA for corresponding PCT/TR/2019/050409.

*Primary Examiner* — Robert A Hopkins
*Assistant Examiner* — Qianping He
(74) *Attorney, Agent, or Firm* — Egbert, McDaniel & Swartz, PLLC

(57) ABSTRACT

An air circulation cover which provides circulation of air between the inner volume and the external environment and the yoke shaft and the sleeve yoke of the cardan shaft, and prevents the ingress of foreign matter into the inner volume. The cover has a ring-shaped main body providing air passage to the center part, a body support member that seats the main body inside the cover assembly housing, a diaphragm mounted in the center section of body support element, air slots providing air passage located on the body of diaphragm, a wide surface filter element, a filter support element and a body outer edge.

3 Claims, 4 Drawing Sheets

(51) Int. Cl.
  *B01D 46/16* (2006.01)
  *B01D 46/00* (2022.01)
  *B01D 46/64* (2022.01)
  *F16D 3/06* (2006.01)
  *F16D 3/38* (2006.01)

(58) Field of Classification Search
  CPC .... B01D 46/54; B01D 46/10; B01D 46/0047; B01D 2275/40; F16C 3/03; F16C 2326/06
  USPC .......................................................... 55/486
  See application file for complete search history.

(56) References Cited

U.S. PATENT DOCUMENTS

| | | | | |
|---|---|---|---|---|
| 6,105,608 A | * | 8/2000 | Katzman | .................... F16K 7/17 137/491 |
| 2011/0005629 A1 | * | 1/2011 | Ostrander | ............. F16K 15/147 137/849 |

* cited by examiner

000

BI-DIRECTIONAL FILTERING AIR CIRCULATION COVER FOR CARDAN SHAFTS

TECHNICAL FIELD

The invention relates to an air circulation cover for cardan shafts which operates between the engine or transmission and the differential and transmits the power is generated by the engine to the differential by means of the rotational motion of the engine.

In particular, the invention discloses an air circulation cover which provides air circulation between the inner volume and the external environment and filtering dust and other particles in the air during the sliding movement of the cardan shaft, which comprises a wide filtration surface, a rubber diaphragm provides bi-directional air passage, and has a lightweight structure due to elastomeric materials in its structure and which provides extra sealing.

PRIOR ART

In the known state of the art, cardan shafts, which are positioned between the transmission output shaft and the differential, are used in motor vehicles in order to transmit the power, which is generated by the engine, with the rotational motion to the differential. Cardan shafts, as is known, comprises several parts. Two of these parts are a yoke shaft and a sleeve yoke. The yoke shaft and sleeve yoke are one of the singular elements of the cardan shaft that operate reciprocally and in conjunction with each other. The yoke shaft has a male spline form on the outer diameter while the sleeve yoke has a female spline in its inner diameter. These two cardan shafts that are mounted by being attached to each other and also enables transmission of the torque that is received from the engine via their spline form. When the torque is being transferred, as a result of the forces received by the wheels of the vehicle, depending on the road conditions, the axial distance difference arising between the two axles, the axle and the gear box or the transmission box, are compensated by means of the sliding movement of the yoke shaft and sleeve yoke with respect to each other and in the axial direction via the spline form.

As mentioned above, a closed inner space is formed in the sleeve yoke and between the sleeve yoke and the yoke shaft. Depending on the positive or negative direction of the sliding motion relative to the sliding axis, the inner volume is expanded or decreased. During the reduction of the volume, the inner air must be disposed of; while in case of expansion, air intake must be provided from outside. However, as the space between the spline forms, which are in contact with each other by grasping each other, is quite small and as a result there is almost no passage of air from the inside to the outside or from the outside to the inside.

In the known state of the art, there are various cover configurations that are mounted in order to control the air inlet into the space between the sleeve yoke and the yoke shaft and to prevent the ingress of foreign particles such as dust. One of them is the inner breather plug having a bidirectional air filter, is subject to the application numbered TR201408527. In the abstract section of the invention it has been described as "The present invention is bi-directional breather plug, which prevents the intake of dust and undesirable impurities into the cardan shaft from the outer environment, and the sleeve yoke of which is adapted at the mounting wall of yoke opening, characterized in comprising a main body having a filter housing fixed to the mounting wall of yoke opening of said sleeve yoke, a filter positioned in the filter housing of said main body, filter sheet embedded and mounted in the filter housing of said main body, and a cover that is fixed on the filter sheet by fitting at the mounting axis."

Some of the deficiencies regarding the cover configuration of said invention are as follows:

Sealing problems are experienced over time at the area where the body outer diameter of the breather plug (cover) is mounted on housing of the sleeve yoke via its outer diameter and for this reason water leakage from the external environment to the inner volume is encountered. As the water leaking into the inner volume progresses, it has a corrosive effect, and it also damages the chemical structure of the grease oil used in the cardan shaft.

Dust and undesired foreign matter entrance from the outside into the cardan shaft causes pore blockage over time, due to the narrow surface area of the filter element. For this reason, air inlet and outlet from the system is difficult to obtain and the primary function of the cardan shaft which is the sliding motion, almost cannot be carried out.

In the present embodiment, the body has a complex geometry. Curved edges, the conical air channels, recesses, air passage channels and S form can be given as examples of complex geometries. This situation requires a higher number of operations during the production of the product. In addition, the difficulty of the operations is also very high. These negativities also increase the costs.

In the present embodiment, the cover comes off over time, from over the filter sheet onto which it has been mounted due to the negative (vacuum) and positive pressures the cover is subjected to and therefore it cannot carry out its present task.

In case of an impact from the external environment on the cover used in the present embodiment, the cover cannot perform its duties such as providing air circulation, protecting the filter element, and its initial task of blocking environmental factors such as water and dirt. In addition, this situation leads to undesired water leakage through the portion between the cap and the body of the present invention.

In the present invention, filter elements made of different materials such as sponges can be used due to their low costs. Non-rigid filter elements, made of flexible material such as sponges, are deformed by air pressure during air circulation and they lose their useful properties.

Considering the lightening of the vehicles in parallel with the developments in the automotive sector in recent years, due to the numerous parts used on the vehicle, the weight of each part is of great importance. In addition, the fact that every mass added to the cardan shaft has a negative effect on balance makes this situation even more important.

As a result, there new structures that will eliminate the above mentioned disadvantages and provides solution to existing systems are required.

OBJECT OF THE INVENTION

The present invention relates to an air circulation cap which meets the above-mentioned requirements, eliminates all of the disadvantages and provides additional advantages.

The primary object of the invention is to provide air circulation between the inner volume and the external environment during the sliding movement of the cardan shaft, and to filter dust and other foreign particles in the air.

Another object of the invention is to prevent water leakage into the inner volume of the cardan shaft by means of the elastomeric material formation of the outer diameter edge of the air circulation cover, thereby providing complete sealing in this section.

The circumferential air slots which have been formed on the body of a rubber diaphragm attached to the central part of the air circulation cover that can be provided in different geometries and quantities, allow the air to pass through by stretching, and upon completion of the air passage, returning to its original state. It is aimed to prevent the entrance of foreign substances and water from the outside by means of the air slots that are engaged during the air passage in and out, in both directions.

The filter surface area has been expanded by means of the filter element configuration in the form of a patelliform cylinder disposed in the air circulation cover subject to the invention. In this way, the number of pores on the filter has been increased and the efficiency of air circulation has been increased accordingly.

In the air circulation cover according to the invention, the main body and other support elements are configured in non-complex simple cylindrical forms. In this way, air circulation cover geometry is simplified and thus production is facilitated and cost advantage has been achieved.

A further object of the invention is to provide an integrated design and mounting rigidity by connecting the diaphragm made of elastomeric material and the body support element by single injection method.

It is aimed to provide protection against environmental impacts to the cardan shaft by means of the protective metal cover located on the rubber diaphragm and besides this to prevent the entrance of water and dust into the inner volume.

In the air circulation cover according to the invention, the large surface filter element is supported from the bottom by a filter support element. In this way, it is intended to prevent the deformation of the filter element over time in the case of using a filter element produced from non-rigid materials such as sponges.

The outer edge of the body, which is a part of the main body of the air circulation cover according to the invention, is supported by providing the assembly integrity with the outer edge support element formed from the elastomeric material to provide sealing. The diaphragm part of the main body formed from the elastomeric material is supported by the body support member and a structure which provides mounting integrity with the inner diameter edge is built. Weight reduction of the air circulation cover is aimed by means of elastomeric materials used instead of metal materials.

The present invention is provided in order to realize all of the advantages mentioned above and as it shall be understood from the following detailed description the invention is related an air circulation cover mounted on the cover assembly housing located on the sleeve yoke which ensures bi-directional air circulation between the inner volume, which formed between the yoke shaft and the sleeve yoke during the operation of the cardan shaft while the yoke shaft and the sleeve yoke are carrying out a sliding motion, and the external environment, and which prevents the ingress of water and foreign matter arriving from the external environment into the inner volume, yoke shaft comprising;

a main body in the form of a ring which provides air passage, a body support element with an opening in the center part of the inner diameter edge which is mounted to said main body from the bottom, a diaphragm that is integral with the inner diameter edge at the center portion of said body support element and that is a part of the elastomeric main body, at least an air slot that can be formed in different geometries and numbers on the body of said diaphragm according to requirement in order to provide the bi-directional air passage, an outer edge support element which is integral with the outer edge of the body, a large surface filter element in the form of a patelliform cylinder, located on the lower part of the body support element, a filter support element mounted to the bottom portion in order to fix and support said patelliform filter element, at least an air passage channel allowing air passage in the center part of said filter support element, which can be provided in different numbers and geometries.

The structural and characteristic features and all of the advantages of the invention will be clearly understood from the detailed description of the figures given below with reference to the accompanying drawings, and therefore if any evaluation is carried out it should be made in view of the below mentioned figures and the detailed description.

BRIEF DESCRIPTION OF THE FIGURES

In order for the embodiment of the present invention to be better understood together with its advantages with additional elements, it should be evaluated in conjunction with the figures described below.

REFERENCE NUMBERS

1. Air Circulation Cover
2. Main Body
2.1. Body Outer Edge
2.2. Diaphragm
2.2.1. Air Slots
3. Body Support Element
3.1. Inner diameter edge
4. Outer Edge Support Element
5. Protective Cover
5.1. Air Circulation Channel
6. Filter Element
7. Filter Support Element
7.1. Air Passage Channel
8. Cardan Shaft
8.1. Cardan Shaft Yoke Assembly
9. Yoke shaft 10. Sleeve Yoke
11. Cover Assembly Housing
12. Inner Volume

DETAILED DESCRIPTION OF THE INVENTION

In this detailed description, the preferred embodiments of the air circulation cover (1) according to the invention are described, only to provide a better understanding of the subject and without any limiting effects.

Figure 4:
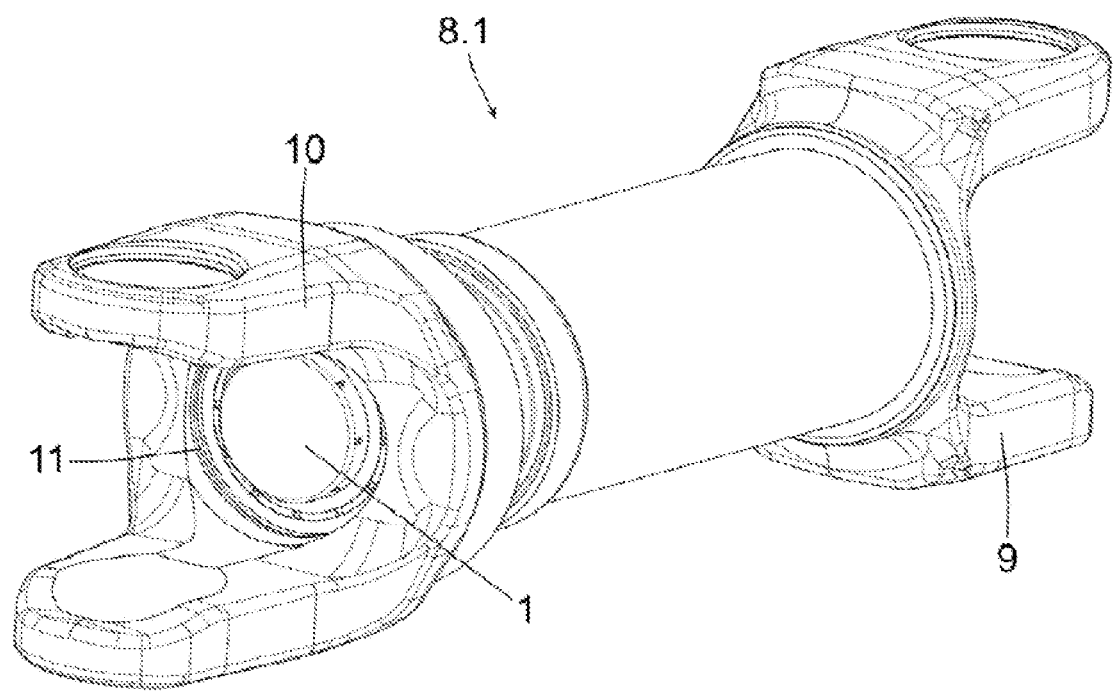
FIG. 4: A three-dimensional view of the air circulation cover subject to the invention, mounted on the cardan shaft yoke assembly.
Figure 5:
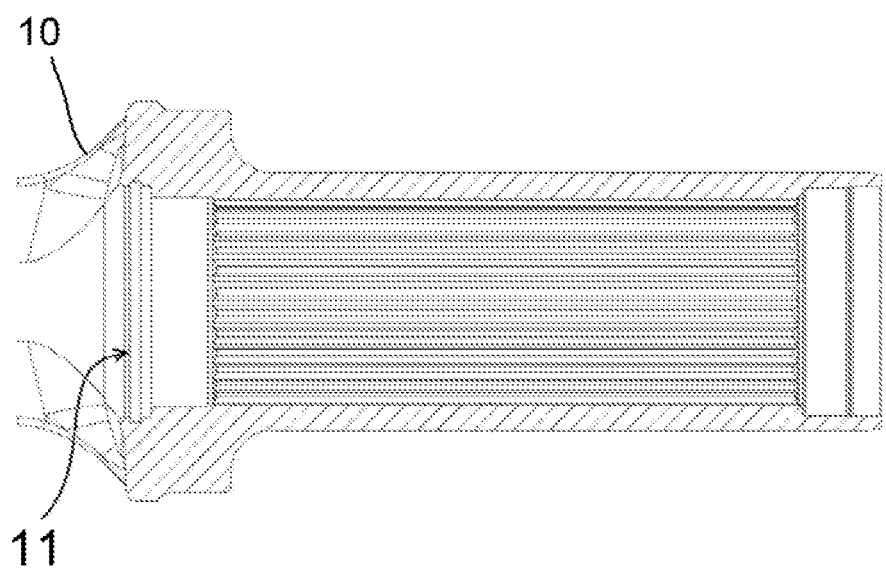
FIG. 5: The inner volume and the area onto which the air circulation cover subject to the invention is mounted on are shown as a side section view of the sleeve yoke.

The invention relates to air circulation cover (1) for cardan shafts (8) which operates between the engine or transmission and the differential and transmits the power is generated by the engine to the differential by means of the rotational motion of the engine. FIG. 4 illustrates a three-dimensional view of the air circulation cover (1) mounted on the cardan shaft yoke assembly (8.1). Essentially, the air circulation cover (1) is the element to ensure the circulation of air between the inner volume (12) formed between the yoke shaft (9) and the sleeve yoke (10) while the yoke shaft (9) and the sleeve yoke (10) are carrying out a sliding motion, and the external environment and during the operation of the cardan shaft (8) and preventing the ingress of foreign particles such as dust into the inner volume (12). According to the side section view of the sleeve yoke (10) illustrated in FIG. 5, the cover assembly housing (11) is shown into which the air circulation cover (1) subject to the invention is mounted.

Figure 2:
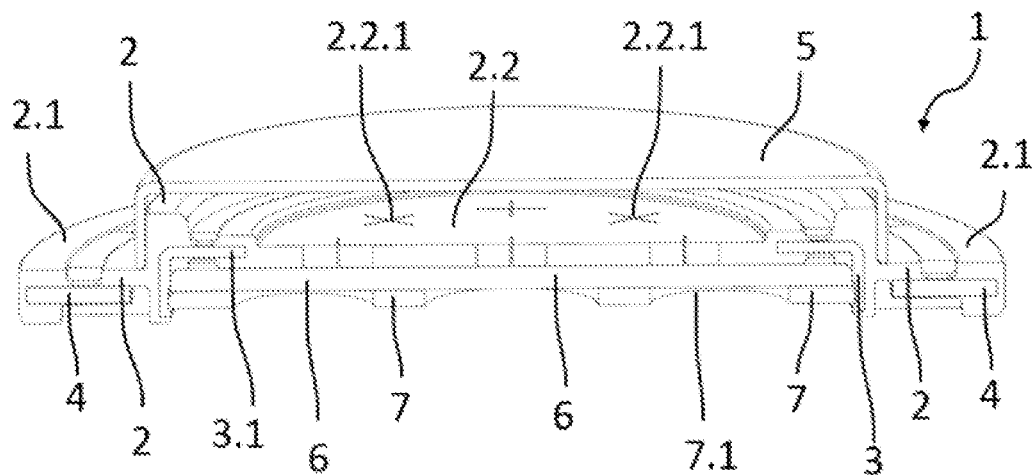
FIG. 2: A sectional view of the air circulation cover subject to the invention illustrated by being divided from its center section at a vertical axis.
Figure 3:
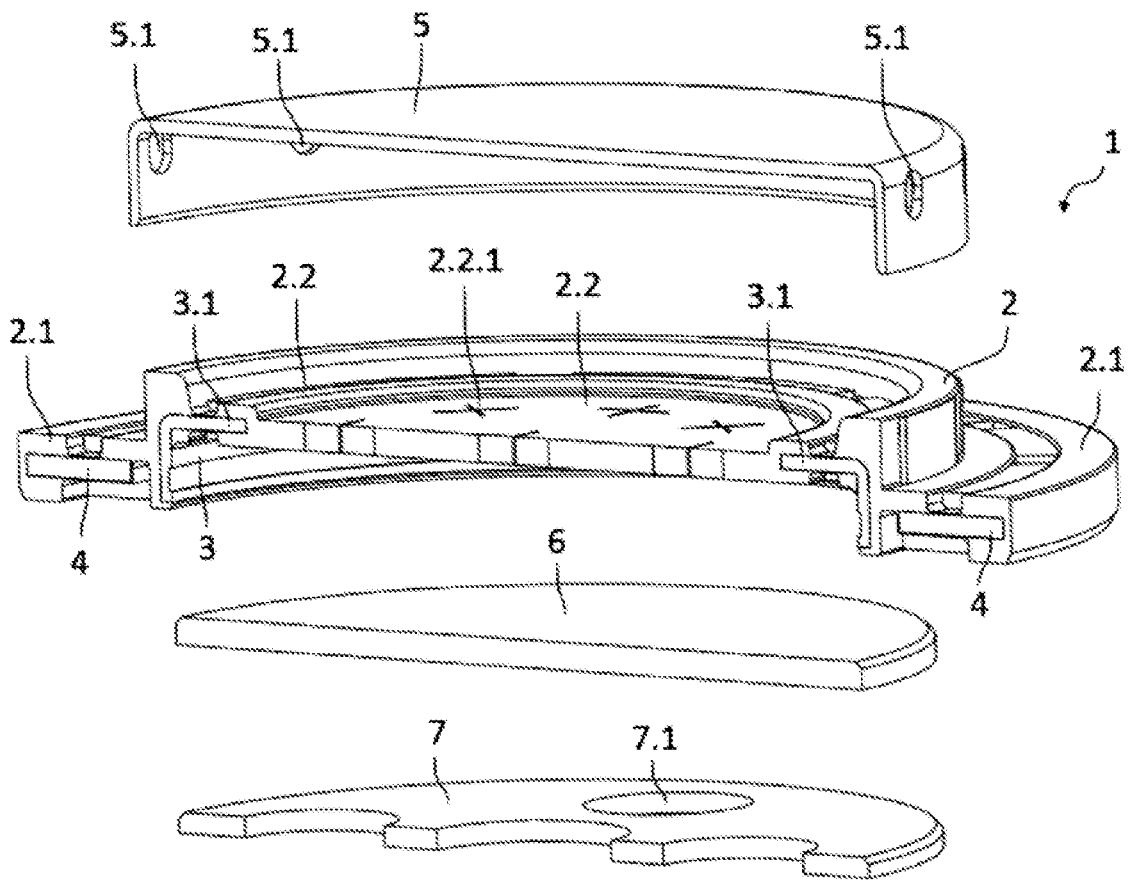
FIG. 3: An exploded view of the air circulating cover subject to the invention illustrated by being divided from its center section at a vertical axis.

FIG. 2 illustrates a sectional view of the air circulation cover (1) divided from its center section at a vertical axis, and FIG. 3 illustrates the exploded view of the same section. Accordingly, the air circulation cover (1) is formed by a circular ring-shaped main body (2). The main body (2) having a circular shape is supported from the bottom by a body support element (3) placed at the lower part of the inner diameter of the body and an outer edge support element (4) located at the bottom of the outer diameter region. The body support element (3) and the outer edge support element (4) are in circular shape and have a circular opening for air passage in the center.

The circular region in the center section of the main body (2) is called the diaphragm (2.2). The diaphragm (2.2) is a part of the main body and has thinner wall thickness than the main body and made of elastomeric materials and has a flexible structure. The diaphragm (2.2) is supported by an inner diameter edge (3.1) corresponding to the circular opening in the center portion of the body support element (3). The outer diameter of the main body (2) is called the body outer edge (2.1) and it is made of elastomeric material. In this way, the main body (2), the diaphragm (2.2) in the center section of the main body (2) and the body outer edge (2.1) are preferably produced from rubber integrally by single injection method. The rubber diaphragm (2.2) adapts to the air pressure expanding and contracting during air circulation.

Figure 1:
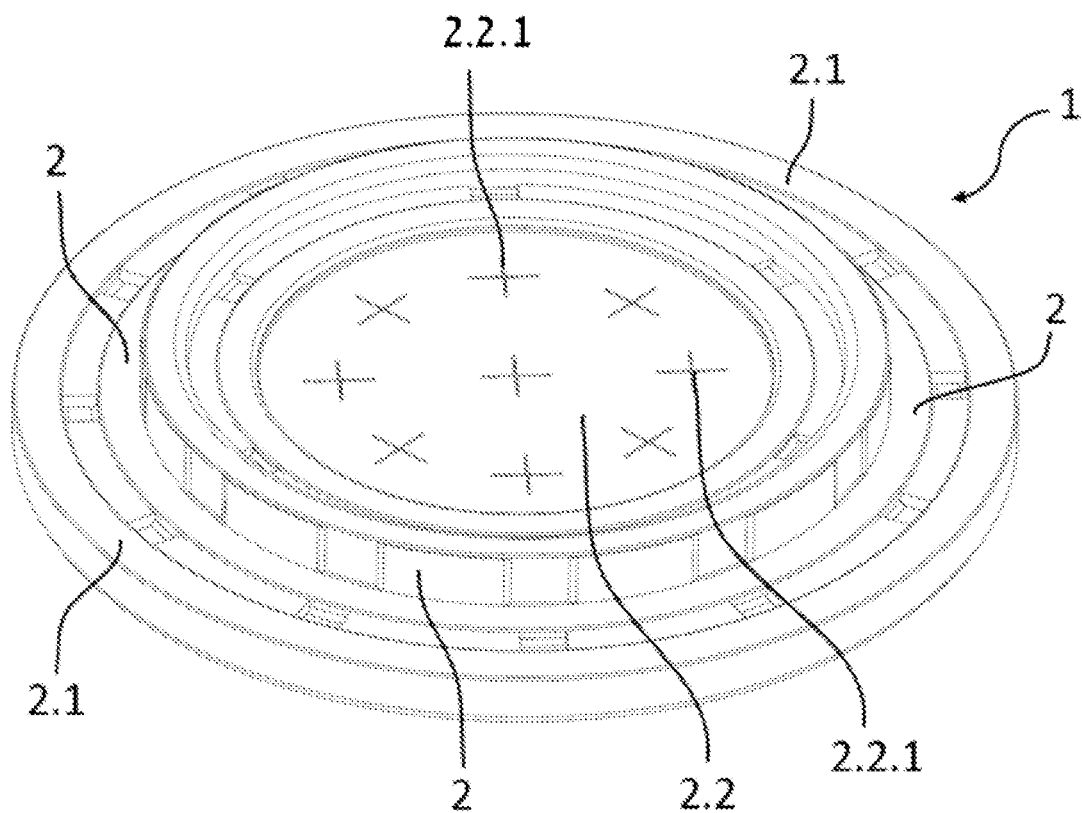
FIG. 1: A three-dimensional view of the air circulation cover according to the invention.

FIG. 1 illustrates a three-dimensional view of the air circulation cover (1) subject to the invention, without the upper protective cover (5). The arrangement of the rubber diaphragm (2.2) forming the center section of the main body (2) will be understood more clearly from FIG. 1. As it can also be seen from FIG. 1, air slots (2.2.1) which formed at predetermined space on the body of the annular rubber diaphragm (2.2) have been provided. Said air slots (2.2.1) provide bi-directional air discharge and they may be configured in different numbers and geometries. During air circulation, the circumferential elastic air slots (2.2.1) allow air to pass through by moving (stretching) and they return to their original position after air passage. Thus, the air slots (2.2.1) prevent foreign particles and water from entering into the section of the inner volume (12).

The body outer edge (2.1) supported by the outer edge support element (4) from the bottom prevents the leakage of water from this section into the inner volume (12) by acting as a gasket in the cover assembly housing (11) into which the air circulation cover (1) is installed.

The upper part of the main body (2) in the air circulation cover (1) of the invention is preferably closed with a protective cover (5) made of sheet metal material. Said protective cover (5) is positioned on the rubber diaphragm (2.2). The protective cover (5) protects the main body (2) and other elements of the cardan shaft (8) from impacts of the environment, and factors such as water and dust. The protective cover (5) also contributes to the prevention of the ingress of water into the inner volume (12). The circumferential air circulation channels (5.1) are located on the side edge of the protective cover (5). Said air circulation channels (5.1) allow air passage through the protective cover (5) to the rubber diaphragm (2.2) section. It is possible to configure the air circulation channels (5.1) in different numbers and geometries.

In the air circulation cover (1) of the invention, the filter component (6) is provided for filtering the air during circulation and for removing foreign matters. Said filter component (6) is positioned in the centre of the body support element (3) such that it is located at the bottom of the main body (2) and the rubber diaphragm (2.2). The filter component (6) is supported from the bottom by a filter support element (7). Thus, the filter element (6) is designed in a cylindrical patelliform and the surface area is expanded as much as possible. Thanks to the surface area expanded filter element (6), the number of filter pores has been increased and thus efficiency in air circulation has also been increased. By means of the filter support element (7) which provides support to the filter element (6) at the bottom, the filter element (6) is prevented from deformation due to air pressure over time.

An air bypass passage (7.1) is located in the center of the filter support element (7). The air passage (7.1) allows air to pass through the filter support element (7). The air bypass passage (7.1) can be one or more and it can not only have a circular shape but it also can have different geometries.

Figure 6:
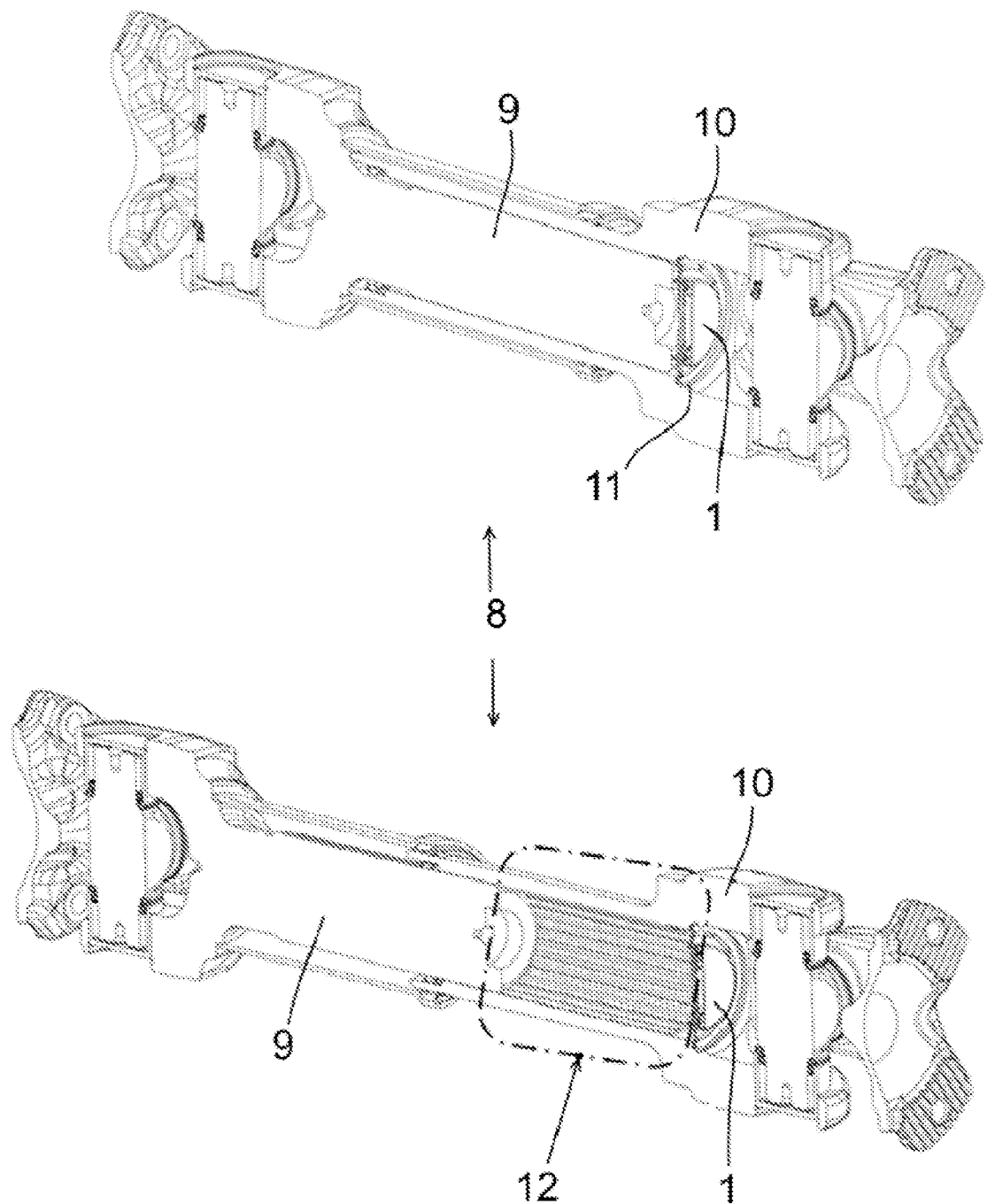
FIG. 6: An illustration of the cardan shaft sliding motion according to the side section view of the cardan shaft onto which the air circulation cover subject to the invention is mounted.

The operating principle of the air circulation cover (1) according to the invention is as follows:

When the cardan shaft (8) carries out a sliding motion as shown in FIG. 6, the sleeve yoke (10) and the yoke shaft (9) is moved away from each other and, as a result, the inner volume (12) is formed in the space between the sleeve yoke (10) and the yoke shaft (9) which can be seen in FIG. 6. During the sliding motion, a vacuum effect occurs in the expanding inner volume (12). The vacuum occurred in the inner volume (12) drives the air circulation cover (1) according to the invention, which is attached to the cover assembly housing (11). By the effect of vacuum, the air in the external environment initially passes through the air circulation channels (5.1) on the side edges of the protective cover (5) covering the upper part of the main body (2) and then impact the rubber diaphragm (2.2) at the bottom. As a result, the circumferentially disposed air slots (2.2.1) on the annular shaped body of the elasticized rubber diaphragm (2.2) are opened and allow air flow. Air flowing through the air slots (2.2.1) passes through the filter element (6) at the bottom. The foreign matter if any, in the air are removed by the filter element (6). The air passing through the filter element (6)

finally passes through the air bypass passage (7.1) on the filter support element (7) filled into the inner volume (12). The vacuum effect is eliminated when sufficient amount of air is filled into the inner volume (12). Therefore, as the force stretching the rubber diaphragm (2.2) is eliminated, the air slots (2.2.1) are closed. In this way, the air passage stops. When the yoke shaft (9) and the sleeve yoke (10) approach each other, the air in the inner volume (12) is compressed and provide pressure in the inner volume. As a result, the process described above is reversed and the air in the interior volume is released to the outside by means of the air circulation cover (1).

The risk of water leakage to the inner volume (12) of the cardan shaft (8) is prevented by the body outer edge (2.1) by acting like a gasket which is located at the outermost diameter of the air circulation cover (1), according to the invention providing full sealing. Furthermore, by means of the circumferential air slots (2.2.1) on the body of the rubber diaphragm (2.2) forming the central portion of the air circulation cover (1) prevents penetration of foreign matter and water into the inner volume (12). Due to the embodiment of the filter element (6) in patelliform cylindrical shape, the filter surface area has been expanded, thus increasing the number of pores in the filtration process and in parallel with this, increased efficiency of air circulation provided.

The main body (2), the body support element (3), the filter element (6) and the other elements in the air circulation cover (1) of the invention are constructed in simple cylindrical forms which are not complex. In this way, the geometry of the air circulation cover (1) is simplified and thus the production is facilitated. As a result, cost advantage has been obtained.

Assembling the main body (2), body outer edge (2.1) and diaphragm (2.2), which are made of elastomeric material, by means of single injection method, an integrated design and a robust mounting structure is obtained. By means of the protective cover (5) positioned on the rubber diaphragm (2.2) provides protection to the cardan shaft (8) against impacts from the external environment. The large surfaced filter element (6) is supported from the bottom by a filter support element (7). In this way, when non-rigid materials such as sponges are used as a filter element (6), the filter element (6) is prevented from being deformed in a short period of time and its service life is extended. The weight of the air circulating cover (1) is slightly reduced by means of the elastomeric materials used to provide air passage and sealing of the air circulation cover (1). The lightened air circulation cover (1) will help to achieve better balance during the operation of the cardan shaft (8).

The invention claimed is:

1. An air circulation cover for mounting on a cover assembly housing so as to ensure bi-directional air circulation between an inner volume and an external environment and to prevent an ingress of water and foreign matter from the eternal environment to the inner volume, the inner volume being formed between a yoke shaft and a sleeve yoke during operation of a cardan shaft while the yoke shaft and the sleeve yoke carry out a sliding motion, the cover assembly being positioned on the sleeve yoke, the air circulation cover comprising:
a main body having a ring shape, said main body adapted to allow air passage;
a body support element having an opening in a center part of an inner diameter edge thereof, said body support element being mounted to a bottom of said main body;
a diaphragm integral with the inner diameter edge at the center part of said body support element, said diaphragm being a portion of said main body, said diaphragm and said main body being elastomeric;
a plurality of air slots flexibly formed on said diaphragm in spaced relation to each other, said plurality of air slots adapted to provide the bi-directional air circulation, said plurality of air slots being movable between an open position and a closed position, the open position allowing air flow therethrough, the closed position preventing the water and foreign matter from entering the inner volume;
an outer edge support element integral with an outer edge of said main body;
a surface filter element having a patelliform cylinder shape, said surface filter element positioned on a lower portion of said body support element;
a filter support element mounted to a bottom portion of said surface filter element so as to fix and support said surface filter element; and
at least one air passage channel positioned at a center part of said filter support element and adapted to allow air passage in said filter support element, said at least one air passage channel capable of being of differing numbers and geometries.

2. The air circulation cover of claim 1, further comprising:
a protective cover positioned at an upper part of said main body and adapted to provide protection against an, impact to said main body.

3. The air circulation cover of claim 2, further comprising:
a plurality of air circulation channels adapted to provide air passage over said protective cover.

* * * * *